United States Patent
Mizumoto et al.

(10) Patent No.: US 9,687,051 B2
(45) Date of Patent: Jun. 27, 2017

(54) RESIN SLIDER FOR SLIDE FASTENERS AND SLIDE FASTENER PROVIDED THEREWITH

(71) Applicant: YKK Corporation, Tokyo (JP)

(72) Inventors: Kazuya Mizumoto, Toyama (JP); Tatsurou Nara, Toyama (JP)

(73) Assignee: YKK Corporation (JP)

( * ) Notice: Subject to any disclaimer, the term of this patent is extended or adjusted under 35 U.S.C. 154(b) by 0 days.

(21) Appl. No.: 14/896,872

(22) PCT Filed: Oct. 2, 2013

(86) PCT No.: PCT/JP2013/076882
§ 371 (c)(1),
(2) Date: Dec. 8, 2015

(87) PCT Pub. No.: WO2015/049753
PCT Pub. Date: Apr. 9, 2015

(65) Prior Publication Data
US 2016/0278489 A1 Sep. 29, 2016

(51) Int. Cl.
*C08L 77/00* (2006.01)
*A44B 19/26* (2006.01)
*B29D 5/00* (2006.01)
*C08L 77/06* (2006.01)
*C08K 3/30* (2006.01)

(52) U.S. Cl.
CPC ............... *A44B 19/26* (2013.01); *B29D 5/00* (2013.01); *C08L 77/06* (2013.01); *C08K 2003/3036* (2013.01)

(58) Field of Classification Search
CPC .............................. A44B 19/26; C08L 77/06
USPC ........................................................ 524/538
See application file for complete search history.

(56) References Cited

U.S. PATENT DOCUMENTS

2015/0017458 A1 * 1/2015 Mizumoto ............... B29D 5/02
428/458

FOREIGN PATENT DOCUMENTS

| DE | 3444813 A1 | 6/1986 |
|---|---|---|
| JP | 2003-225102 A | 8/2003 |
| JP | 2009-155551 A | 7/2009 |
| JP | 4517277 B2 * | 8/2010 |
| JP | 2013-067786 A | 4/2013 |
| WO | 2013/098978 A1 | 7/2013 |

OTHER PUBLICATIONS

Translation of JP 4517277, Aug. 4, 2010.*
International Search Report, PCT Application No. PCT/JP2013/076882, mailed Dec. 24, 2013.
Translation of Office Action, Japanese Patent Application No. 2015-540313, mailed Jun. 28, 2016.
International Preliminary Report on Patentability, PCT Application No. PCT/JP2013/076882, mailed Apr. 14, 2016.

* cited by examiner

*Primary Examiner* — Hui Chin
(74) *Attorney, Agent, or Firm* — Kilpatrick Townsend & Stockton LLP

(57) ABSTRACT

Provided is a polyamide resin slider for a slide fastener which provides both strength and durability. The slider material is a polyamide resin composition that includes an aliphatic polyamide having a melting point of 220° C. to 310° C., an aromatic polyamide having a melting point of 230° C. to 310° C., and reinforced fiber; wherein the ratio of the aromatic polyamide present in the summed mass of the aliphatic polyamide and the aromatic polyamide is greater than or equal to 10% by weight and less than or equal to 50% by weight.

11 Claims, 4 Drawing Sheets

RESIN SLIDER FOR SLIDE FASTENERS AND SLIDE FASTENER PROVIDED THEREWITH

TECHNICAL FIELD

The present invention relates to a resin slider for slide fasteners. The present invention also relates to a slide fastener provided with the resin slider for slide fasteners.

BACKGROUND ART

A slide fastener is an opening and closing device for an article utilized in not only daily necessities such as clothing, bags, shoes and general merchandise but also in industrial goods such as a water tank, a fishing net and a space suit.

In FIG. 1, the constitution of a typical slide fastener is shown, and the slide fastener 10 is mainly composed of three parts: a pair of long tapes 11, a number of elements 12 which are engaging parts of the fastener sewn on along one side edge of each tape, and a slider 13 to control opening and closing of the fastener by engaging and separating the elements 12. In addition, a top end stop 14 and an opening device 15 can be provided to prevent dropping off of the slider 13, and a pull tab 16 can be attached on the front face of the slider 13. The opening device 15 can be composed of an insert pin 15a and a box body 15c with a box pin 15b. The slider 13 releases engagement between elements 12, while being moved to the opening device 15 provided at the bottom portion of the long tapes 11, and then, the insert pin 15a is pulled out from the box body 15c to separate each tape 11.

The slider composing a slide fastener is a molded component capable of being manufactured by means of injection molding, and it is known that the slider can be manufactured using polyamide as a material.

For example, DE3444813 (Patent Literature 1) describes a method (Claim 1) for injection molding a slider by using as a material a polyamide reinforced with glass fiber, for the purpose of improving the durability against washing and ironing of sliders used for slide fasteners for bedclothes and the abrasion resistance against sliding of sliders. The length of the glass fiber is described to be 4 to 8 mm, and the content of the glass fiber is described to be 25% by weight or more (Claim 1). The slider is described to be subjected to a recrystallization treatment after molding (Claim 1). Polyamide 6, 6 is described to be used as the polyamide (Claim 6). It is also described that a polyamide containing neither a lubricant nor a gliding agent is used, and the content of glass fiber is approximately 40% by weight (Claim 5).

Japanese Patent No. 4517277 (Patent Literature 2) also describes the usability of a polyamide resin as components for slide fasteners. In the patent literature concerned, examples of the polyamide resin include polyamide 6, polyamide 66, polyamide MXD6, polyamide 6T, polyamide 11 and polyamide 12. In particular, a polyamide resin having the carpamide repeating unit in a content of 80 mol % or more and/or a polyamide resin having the hexamethyleneadipamide repeating unit in a content of 80 mol % or more is described as preferable.

WO2013/098978 (Patent Literature 3) discloses a polyamide resin composition including 30 to 50% by mass of a polyamide and 50 to 70% by mass of reinforcing fiber wherein 50% by mass or more of the polyamide is an aliphatic polyamide. As described in the patent literature concerned, the content of the aliphatic polyamide in the polyamide is preferably 80% by mass or more, from the viewpoint of the improvement of the platability.

CITATION LIST

Patent Literature

Patent Literature 1: DE 3444813
Patent Literature 2: Japanese Patent No. 4517277
Patent Literature 3: International Publication No. WO 2013/098978

SUMMARY OF INVENTION

Technical Problem

As the indices for evaluating the mechanical properties of a slider, the slider tab pull off strength and the back-and-forth opening/closing durability may be quoted. Among the components for slide fasteners, the slider is particularly complicated in shape, and is also high in the load during use, and accordingly, the levels of the mechanical properties required for the slider are higher as compared with other components. The slider undergoes tensile stress and is exposed to the friction with the fastener chain every time when the fastener is opened or closed, and is accordingly required to have excellent strength and excellent durability as compared with other components composing a slide fastener. However, for a slider using a polyamide resin, the slider satisfying both strength and durability has never hitherto been sufficiently investigated, and there still remains room for improvement.

Accordingly, the subject of the present invention is to provide a polyamide resin slider for slide fasteners, having both strength and durability in combination. Another subject of the present invention is to provide a slide fastener provided with such a slider.

Solution to Problem

The present inventor has intensively studied the polyamide ingredient to compose the slider in order to solve the subjects described above, and consequently, has found that a slider having an excellent balance between strength and durability can be obtained by appropriately compounding a predetermined aliphatic polyamide and a predetermined aromatic polyamide with each other. As far as the present inventor knows, there has hitherto been no case where the balance between the strength and the durability of a slider is significantly improved by positively adding an aromatic polyamide to an aliphatic polyamide.

The present invention has been accomplished on the basis of the findings described above, and in one aspect, is a resin slider for slide fasteners, formed by using as a material a polyamide resin composition including an aliphatic polyamide having a melting point of 220 to 310° C., an aromatic polyamide having a melting point of 230 to 310° C., and reinforcing fiber, wherein the ratio of the aromatic polyamide in the total mass of the aliphatic polyamide and the aromatic polyamide is 10% by mass or more and 50% by mass or less.

In an embodiment of the resin slider according to the present invention, the melting point difference between the aliphatic polyamide and the aromatic polyamide is 50° C. or less.

In another embodiment of the resin slider according to the present invention, the content of the reinforcing fiber in the total mass of the aliphatic polyamide, the aromatic polyamide and the reinforcing fiber is 50 to 60% by mass.

In yet another embodiment of the resin slider according to the present invention, the aliphatic polyamide includes one or more selected from the group consisting of polyamide 66, polyamide 610 and polyamide 612.

In yet another embodiment of the resin slider according to the present invention, the aliphatic polyamide includes polyamide 66.

In yet another embodiment of the resin slider according to the present invention, the aromatic polyamide includes polyamide MXD6.

In yet another embodiment of the resin slider according to the present invention, the proportion of the aromatic polyamide in the total mass of the aliphatic polyamide and the aromatic polyamide is 20 to 40% by mass.

In yet another embodiment of the resin slider according to the present invention, the resin composition includes a pigment in a content of 1 to 5% by mass based on the total mass of the aliphatic polyamide, the aromatic polyamide and the reinforcing fiber.

In yet another embodiment of the resin slider according to the present invention, the b value in the Lab color system in the undyed state is 10 or less.

In yet another embodiment of the resin slider according to the present invention, the slider is dyed.

The present invention, in another aspect, is a slide fastener provided with the resin slider for slide fasteners according to the present invention.

Advantageous Effects of Invention

According to the present invention, a slider for slide fasteners, having both strength and durability in combination is obtained. Additionally, when the slider is molded by using as a material the resin composition having the composition according to the present invention, the obtained slider can exhibit in an undyed state thereof natural white color weak in yellowish tint. Accordingly, the slider according to the present invention is high in color reproducibility when dyed.

DESCRIPTION OF EMBODIMENTS (1. Polyamide Resin)

Figure 1:
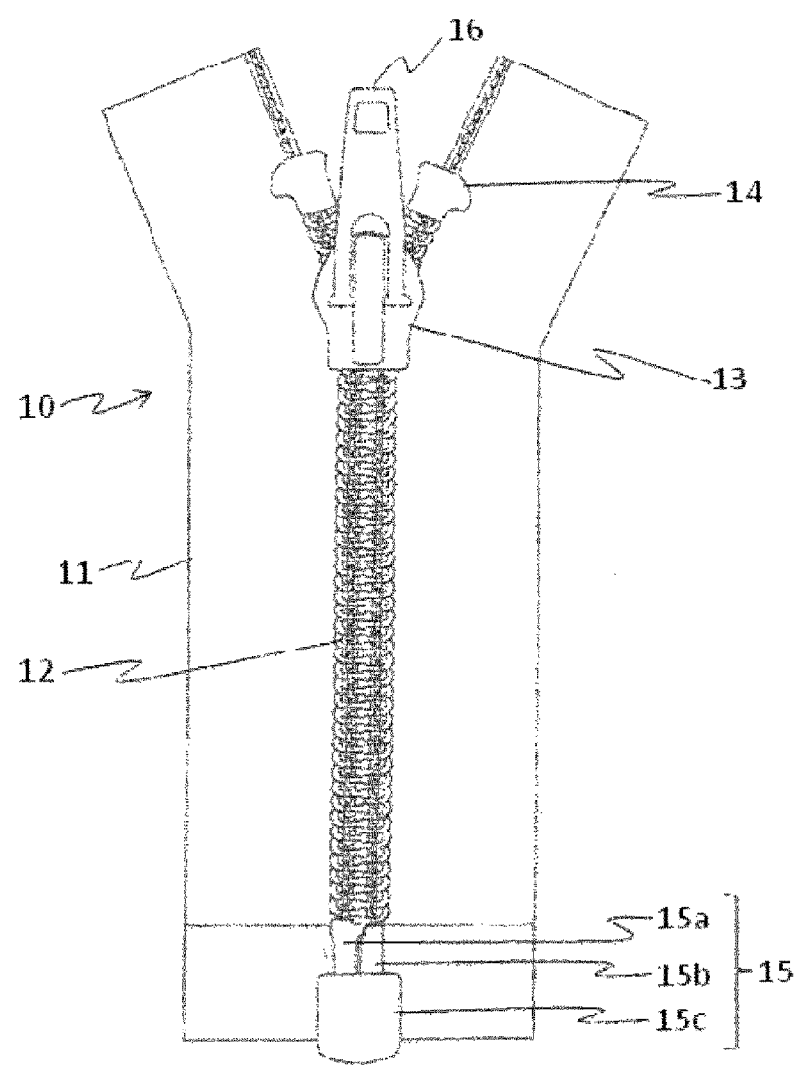
FIG. 1 is a front view showing an example of constitution of a slide fastener.

The slider for slide fasteners according to the present invention uses a polyamide resin composition as a material. In the present invention, an aliphatic polyamide and an aromatic polyamide are used in combination as a polyamide resin. The aliphatic polyamide means a polyamide composed of an aliphatic skeleton, and can be generally classified as a polyamide synthesized with an aliphatic amine and an aliphatic dicarboxylic acid as raw materials, or a polyamide synthesized with an aliphatic ω-amino acid or the lactam thereof as a raw material. The aromatic polyamide means a polyamide having at least an aromatic ring in the molecule thereof, and can be generally classified as a polyamide synthesized with an aromatic amine and an aromatic dicarboxylic acid as raw materials, a polyamide synthesized with an aromatic amine and an aliphatic dicarboxylic acid as raw materials, or a polyamide synthesized with an aliphatic amine and an aromatic dicarboxylic acid as raw materials.

Polyamides have different melting points depending on molecular structure and molecular weights thereof. Polyamides different in molecular weight from each other have different melting points even when the polyamides have the same molecular structure. The higher melting point a polyamide resin has, the more the molding temperature thereof is raised, thereby easily causing yellowing. Therefore, for both an aliphatic polyamide and an aromatic polyamide, a polyamide resin having a melting point of 310° C. or lower is preferably used, more preferably a polyamide resin having a melting point of 305° C. or lower is used, and furthermore preferably a polyamide resin having a melting point of 300° C. or lower is used. In addition, since a polyamide resin with a lower melting point has a less number of the amide bond per unit molecular structure and has a more flexible chain, thereby tending to have lower strength and rigidity, the aliphatic polyamide preferably has a melting point of 220° C. or higher, the aromatic polyamide preferably has a melting point of 230° C. or higher, the polyamide resin in which the aliphatic polyamide and the aromatic polyamide each have a melting point of 240° C. or higher is more preferably used, and the polyamide resin having a melting point of 250° C. or higher is furthermore preferably used.

When the aliphatic polyamide to be used and the aromatic polyamide to be used are significantly different in melting point from each other, there occurs problems that the dispersibility is degraded due to the melt viscosity difference and the strength is spoiled, and the resin is degraded and undergoes yellowing due to the adoption of the molding conditions coping with a resin having a high melting point; accordingly, the aliphatic polyamide and the aromatic polyamide are preferably free from the melting point difference. Specifically, the melting point difference between both polyamides is preferably 50° C. or less, more preferably 40° C. or less and furthermore preferably 30° C. or less.

In the present invention, the melting point of each of the polyamide resins composing the resin composition is defined as the peak top temperature of the endothermic peak when the endothermic quantity is measured by a DSC (differential scanning calorimeter). For the melting point of a copolymer, the melting point is defined as the peak top temperature of the highest-temperature endothermic peak top.

In the polyamide ingredients, the aliphatic polyamide mainly contributes to the improvement of the durability, and the aromatic polyamide mainly contributes to the improvement of the strength. Accordingly, the increase of the compounding ratio of the aliphatic polyamide allows the durability of the slider to be improved, and the increase of the compounding ratio of the aromatic polyamide allows the strength of the slider to be improved. On the other hand, when the compounding ratio of either of the aliphatic and aromatic polyamides is excessive, it is difficult to achieve the compatibility between the strength and the durability. Specifically, from the viewpoint of obtaining excellent durability, in the total mass of the aliphatic polyamide and the aromatic polyamide, the ratio of the aromatic polyamide is set to be preferably 50% by mass or less, more preferably 40% by mass or less and furthermore preferably 35% by mass or less. Also, from the viewpoint of obtaining excellent strength, in the total mass of the aliphatic polyamide and the aromatic polyamide, the ratio of the aromatic polyamide is set to be preferably 10% by mass or more, more preferably 20% by mass or more and furthermore preferably 25% by mass or more.

A polyamide resin is obtained by copolycondensation of a diamine and a dicarboxylic acid, polycondensation of an ω-aminoacid, ring-opening polymerization of a lactam and the like. The diamine includes, for example, straight-chain or branched-chain aliphatic diamines, such as ethylenediamine, propylenediamine, butylenediamine, hexamethylenediamine, 2-methylpropanediamine, 3-methylpropanediamine, octamethylenediamine, decanediamine and dodecanediamine; aromatic diamines, such as meta-xylylenediamine, para-xylylenediamine, meta-phenylenediamine and para-phenylenediamine. The dicarboxylic acid includes, for example, straight-chain or branched-chain aliphatic dicarboxylic acids, such as succinic acid, propanedioic acid, butanedioic acid, pentanedioic acid, adipic acid, heptanedioic acid, octanedioic acid, nonanedioic acid, decanedioic acid, dodecanedioic acid, undecanedioic acid, dimer acid and hydrogenated dimer acid; aromatic dicarboxylic acids, such as phthalic acid, terephthalic acid, isophthalic acid, naphthalenedicarboxylic acid, 2-chloroterephthalic acid, 2-methylterephthalic acid, 5-methylisophthalic acid, and 5-sodium sulfoisophthalic acid and 1,5-naphthalenedicarboxylic acid. The ω-aminoacids include, for example, 6-aminohexanoic acid, 11-aminoundecanoic acid, and 12-aminododecanoic acid. The lactam includes ε-caprolactam, undecanelactam, and lauryllactam.

Specific examples of the structure of the aliphatic polyamide typically include, without being limited to, the polyamide having the repeating monomer unit represented by one of the following formulas or the polyamide having the combination of the monomer repeating units represented by both of the following formulas: $-NHR_1NHC(=O)R_2C(=O)-$ or $-NHR_1C(=O)-$ (in the formulas, $R_1$ and $R_2$ are the same or different groups, and are each an alkylene group having at least 2 carbon atoms, preferably having 2 to 12 carbon atoms and more preferably having 6 to 10 carbon atoms). Specific examples of the aliphatic polyamide include: aliphatic polyamides synthesized by co-condensation polymerization of aliphatic diamines and aliphatic dicarboxylic acids such as polytetramethyleneadipamide (polyamide 46), polyhexamethyleneadipamide (polyamide 66), polyhexamethyleneazelaamide (polyamide 69), polyhexamethylenesebacamide (polyamide 610), polyhexamethylenedodecanediamide (polyamide 612), polyheptamethylenepimelamide (polyamide 77), polyoctamethylenesuberamide (polyamide 88), polynonamethyleneazelaamide (polyamide 99), and polydecamethyleneazelaamide (polyamide 109); aliphatic polyamides synthesized by polycondensation reaction of ω-amino acids such as poly(4-aminobutyric acid) (polyamide 4), poly(6-aminohexanoic acid) (polyamide 6), poly(7-aminoheptanoic acid) (polyamide 7), poly(8-aminooctanoic acid) (polyamide 8), poly(9-aminononanoic acid) (polyamide 9), poly(11-aminodecanoic acid) (polyamide 10), poly(11-aminoundecanoic acid) (polyamide 11), and poly(12-aminododecanoic acid) (polyamide 12); and aliphatic polyamides synthesized by ring-opening polymerization of lactams. These may be used singly or in a mixture of two or more.

Furthermore, a copolymer obtained by any combination of the repeating units of aliphatic polyamides can also be used. Such aliphatic polyamide copolymer includes, though not restrictive, caprolactam/hexamethyleneadipamide copolymer (nylon 6/6,6), hexamethyleneadipamide/caprolactam copolymer (nylon 6,6/6), and hexamethyleneadipamide/hexamethylene-azelamide copolymer (nylon 6,6/6,9).

Among the aliphatic polyamides, from the viewpoint of achieving the compatibility between strength and durability, one or more selected from the group consisting of polyamide 66, polyamide 610 and polyamide 612 are preferable, and polyamide 66 is more preferable. Accordingly, in the aliphatic polyamide ingredient according to the present invention, 90% by mass or more of the aliphatic polyamide ingredient is preferably composed of these three types, 95% by mass or more of the aliphatic polyamide ingredient is more preferably composed of these three types, 99% by mass or more of the aliphatic polyamide ingredient is furthermore preferably composed of these three types, and 100% by mass of the aliphatic polyamide ingredient is furthermore preferably composed of these three types. Moreover, in the aliphatic polyamide ingredient according to present invention, 90% by mass or more of the aliphatic polyamide ingredient is preferably composed of polyamide 66, 95% by mass or more of the aliphatic polyamide ingredient is more preferably composed polyamide 66, 99% by mass or more of the aliphatic polyamide ingredient is furthermore preferably composed of polyamide 66 and 100% by mass of the aliphatic polyamide ingredient is furthermore preferably composed of polyamide 66.

Specific examples of the structure of the aromatic polyamide include: polyhexamethyleneisophthalamide (polyamide 6I), polyhexamethyleneterephthalamide (polyamide 6T), polymetaxylyleneadipamide (polyamide MXD6), polyparaxylyleneadipamide (polyamide PXD6), polybis(3-methyl-4-aminohexyl)methaneterephthalamide (polyamide PACMT), polybis(3-methyl-4-aminohexyl)methaneisophthalamide (polyamide PACMI), polytetramethyleneterephthalamide (polyamide 4T), polypentamethyleneterephthalamide (polyamide 5T), poly-2-methylpentamethyleneterephthalamide (polyamide M-5T), polyhexamethyleneterephthalamide (polyamide 6T), polyhexamethylenehexahydroterephthalamide (polyamide 6T(H)), poly-2-methyl-octamethyleneterephthalamide, polynonamethyleneterephthalamide (polyamide 9T), polydecamethyleneterephthalamide (polyamide 10T), polyundecamethyleneterephthalamide (polyamide 11T), polydodecamethyleneterephthalamide (polyamide 12T), polybis(3-methyl-4-aminohexyl)methaneterephthalamide (polyamide PACMT), and polybis(3-methyl-4-aminohexyl)methaneisophthalamide (polyamide PACMI). These may be used singly or in a mixture of two or more.

Among the aromatic polyamides, from the viewpoint of achieving the compatibility between strength and durability, polyamide MXD6, polyamide 9T and polyamide 10T are preferable, and polyamide MXD6 is more preferable. Accordingly, in the aromatic polyamide ingredient according to the present invention, 90% by mass or more of the aromatic polyamide ingredient is preferably composed of these three types, 95% by mass or more of the aromatic polyamide ingredient is more preferably composed of these three types, 99% by mass or more of the aromatic polyamide ingredient is furthermore preferably composed of these three types, and 100% by mass of the aromatic polyamide ingredient is furthermore preferably composed of these three types. Moreover, in the aromatic polyamide ingredient according to present invention, 90% by mass or more of the aromatic polyamide ingredient is preferably composed of MXD6, 95% by mass or more of the aromatic polyamide ingredient is more preferably composed MXD6, 99% by mass or more of the aromatic polyamide ingredient is furthermore preferably composed of MXD6 and 100% by mass of the aromatic polyamide ingredient is furthermore preferably composed of MXD6.

(2. Reinforcing Fiber)

Strength of the slider can be enhanced by incorporating reinforcing fiber into the polyamide resin composition. By surface treatment with a silane coupling agent, a titanate coupling agent, an aluminate coupling agent or the like, a polyamide can be expected to have an improved affinity with the reinforcing fiber than a polyester, and therefore the polyamide can provide a higher rigidity without spoiling the strength even when the reinforcing fiber is added in a large amount. Specifically, in the total mass of the polyamide resin (typically, an aliphatic polyamide and an aromatic polyamide) and the reinforcing fiber, the concentration of the reinforcing fiber is set to be preferably 45% by mass or more and more preferably 50% by mass or more. However, when the concentration of the reinforcing fiber is too high, the moldability is deteriorated and the strength is also degraded, and accordingly, the concentration of the reinforcing fiber in the total mass of the polyamide resin and the reinforcing fiber is set to be preferably 70% by mass or less and more preferably 60% by mass or less.

The reinforcing fiber used in the present invention may include, but not limited to, for example, organic fiber such as carbon fiber and aramid fiber, as well as inorganic fiber such as glass fiber, an acicular wollastonite and whiskers (examples: calcium titanate whisker, calcium carbonate whisker, aluminum borate whisker). Preferably, any one or more selected from glass fiber, aramid fiber and carbon fiber are used, and glass fiber is more preferable in that the strength can be enhanced, while retaining flowability at a certain level or higher. These may be used singly or in combination of two or more.

Preferably, the mean diameter of the reinforcing fibers before compounding with a resin is approximately 3-20 μm, and more preferably approximately 5-12 μm. Preferably, the mean fiber length thereof before compounding with a resin is approximately 1 mm-10 mm, and more preferably approximately 3 mm-6 mm. It is noted that the fiber diameter refers to a diameter calculated from the cross sectional area of the reinforcing fiber which has been determined, provided that the cross section is regarded as a perfect circle. Preferably, the aspect ratio, i.e., the mean fiber diameter: the mean fiber length, of the reinforcing fiber before compounding with a resin is 1:50-3:10000, and more preferably 1:300-1:1200. Typically, a mean fiber length of the reinforcing fiber is reduced to 1/10-1/20 of the initial fiber length after compounding with a resin and molding, and for example, is 0.1-1 mm, and typically 0.1-0.5 mm.

The total content of the polyamide resin and the reinforcing fiber in the polyamide resin composition is typically 90% by mass or more and more typically 95% by mass or more.

(3. Pigment and Other Additives)

Although polyamide resins easily cause yellowing, thereby exhibiting low color reproducibility, the color reproducibility can be enhanced by adding a pigment. On the other hand, addition of the pigment in a high concentration is not preferred because the pigment added in an increased amount may reduce the strength or causes a problem that high-density color is not expressed when dyed due to excessive whiteness. The content of the pigment in the polyamide resin composition is preferably 0.5% by mass or more and more preferably 1.0% by mass or more, based on the total mass of the aliphatic polyamide, aromatic polyamide and reinforcing fiber, from the viewpoint of the color reproducibility. Also, the content of the pigment in the polyamide resin composition is preferably less than 5.0% by mass, and more preferably 4.5% by mass or less based on the total mass of the aliphatic polyamide, aromatic polyamide and reinforcing fiber, from the viewpoint of dark color dyeability. When using an excessive amount of the pigment, too much white color makes, for example, red to pink, thereby being difficult to express dark colors. Examples of the pigment include, without being limited to: zinc sulfide, antimony oxide, titanium oxide and zinc oxide; zinc sulfide is preferable from the viewpoint of safety.

Additionally, commonly used additives such as a heat stabilizer, a weathering agent and a hydrolysis-resistant agent may be added to the polyamide resin composition in such a way that the total content of these additives is, for example, 10.0% by mass or less, typically 5% by mass or less and more typically 2% by mass or less.

(4. Slider)

A slider for slide fasteners can be manufactured by using as a material the polyamide resin composition according to the present invention. Moreover, various types of slide fasteners provided with the slider can be manufactured.

Description is made on an example of the method for manufacturing a slider by using the polyamide resin composition according to the present invention. First, a polyamide, which is an ingredient of the resin composition, reinforcing fiber, a pigment and the like are sufficiently kneaded so as not to cause bias of the ingredients. Kneading can be carried out using a single screw extruder, a twin screw extruder, a kneader or the like. The resin composition after kneading is injection molded by using a mold having a predetermined slider shape to complete a slider in an undyed state. The injection molding conditions are not particularly limited, but a twin screw extruder can be suitably used. In the case of glass fiber in a high concentration, it is preferred to compound the glass fiber with a resin in a molten state using a side feeder in terms of productivity. With respect to the injection molding conditions, from the viewpoint that high productivity can be ensured without deterioration, the cylinder temperature is preferably set to a range of 280-320° C., and the mold temperature is preferably set to, for example, 90-130° C., which is higher than usual.

According to the present invention, in an embodiment, the b value in the Lab color system of a slider in an undyed state can be made to be 10 or less. The b value is a value representing the color tone (a positive value indicates a yellowish tint, and a negative value indicates a bluish tint) of the yellow-blue system; as the b value comes closer to 0, the yellowish tint gets lower, rendering the color tint more desirable. The b value can be made to be preferably 9 or less, more preferably 8 or less, and can be, for example, within a range from 5 to 10.

The slider in an undyed state can be subjected to dyeing. The method for dyeing is not particularly limited, but dip dyeing and printing are representative. With respect to the dye, though not restrictive, premetallized dyes, acidic dyes, thren dyes and disperse dyes are suitable, and among others, acidic dyes can be particularly suitably used because of good dyeing affinity and fastness. The dyeing can be performed simultaneously with or separately from other constituent components of slide fasteners. The b value can be suppressed to be small by reducing the compounding ratio of the aromatic polyamide. In the present invention, as described above, the ratio of the aromatic polyamide in the total mass of the aliphatic polyamide and the aromatic polyamide is controlled to be 50% by mass or less, and such a compounding ratio of the aromatic polyamide is effective also for suppressing the b value. The b value tends to steeply increase when the compounding ratio of the aromatic polyamide exceeds 50% by mass.

The slider according to the present invention can also be subjected to various types of metal plating. Examples of the metal plating include, without being particularly limited to: chromium plating, nickel plating, copper plating, gold plating, brass plating and plating with other alloys. The metal plating method is not particularly limited; in addition to electroplating method (before electroplating, electroless plating is preferably performed), dry plating such as vacuum vapor deposition method, sputtering method, or ion plating method may be appropriately performed. These methods may also be combined. Among these, electroplating method capable of certainly coating the inside of the slider having a complicated shape is preferable, and it is preferable to perform electroplating after electroless plating is preliminarily performed.

EXAMPLES

Hereinafter, Examples of the present invention will be presented, but these are provided in order for a better understanding of the present invention and advantages thereof, and not intended that the present invention is limited thereto.

As the polyamide resins, the following were prepared.
PA66 (melting point: 265° C.)
MXD6 (melting point: 235° C.)
PA9T (melting point: 305° C.)
PA6T/PA6I (copolymer, melting point: 320° C.)
As the reinforcing fiber, glass fiber (mean fiber diameter: 11 μm, mean fiber length before molding: 3 mm, mean fiber length after molding: 0.25 mm) was used.

The melting point of each of the polyamide resins was measured by using DSC (EXTAR6000, made by Seiko Instruments Inc.), on the basis of the above-described definition, under the following conditions.
Sample amount: 5 to 10 mg
Atmosphere: nitrogen gas
Heating rate: 10° C./min
Measurement temperature range: 0 to 350° C.
Reference pan: empty
As the pigment, zinc sulfide (ZnS) was used.

The polyamide resin, glass fiber and pigment were kneaded with a twin screw extruder so as to give the respective compounding ratios (mass basis) described in Table 1; then each molten resin was extruded in a strand form, cooled to be solidified in a cooling water bath, and then, cut by a pelletizer, to prepare a pellet of each resin composition. The pellets of the resin compositions were injection-molded, and thus sliders for slide fasteners of class M (chain width: 5.5 mm or more and 7.0 mm or less) defined by JIS S3015 were formed. The covers and pull tabs of the sliders were also injection-molded from the same materials. The covers are components to fix the pull tabs to the sliders.

For each of the obtained sliders, after dyeing, the slider tab pull off strength test and the slider back-and-forth opening/closing durability test were performed according to JIS-S3015(2007). Additionally, in order to evaluate the yellowish tint before dyeing, the b value in the Lab color system on the external surface of each of the sliders was measured according to JIS-Z8729 (2004). As the light source, a D65 light source was used.

The slider tab pull off strength is evaluated by the following procedure. Each of the obtained sliders was dyed with a blue acidic dye (Tectilon Blue 4R), and then the resistance of each slider 13 is measured when loads are applied to the pull tab 16 and the lower surface of the slider body of the completed single slider 13. The strength test is performed by observing whether or not the slider 13 is damaged or deformed under the conditions that the pull tab 16 of the slider 13 is pulled in the direction at 90° to the upper surface of the slider to apply a load to the pull tab 16, and a load is further applied to the lower surface of the slider itself.

In the back-and-forth opening/closing durability test, each of the obtained sliders was dyed with a blue acidic dye (Tectilon Blue 4R), then a slide fastener was set in a predetermined tester, the slider is moved back and forth at a rate of 30 times/min, and then whether or not the abnormality occurs is visually verified. The number of the times of the back-and-forth movements until abnormality is found is taken as the measurement value.

The results are shown in Table 1. In each of Examples 1 to 7, because the combination of the polyamide resins and the compounding ratios therebetween were appropriate, the mechanical strength was high as shown by the slider tab pull off strength of 180 N or more, and the number of times of the back- and forth movements in the back-and-forth opening/closing durability test was as excellent as 650 or more.

In particular, in each of Examples 1, 3, 4 and 6 in which PA66 and MXD6 were combined, and the compounding amount of PA66 was optimized, the slider tab pull off strength was as excellent as 185 N or more, and the number of times of the back- and forth movements in the back-and-forth opening/closing durability test was as excellent as 1640 or more.

On the other hand, in Comparative Example 1, no aromatic polyamide was used, and accordingly the slider tab pull off strength was insufficient.

In Comparative Example 2, both of the aliphatic polyamide and the aromatic polyamide were used, but the compounding ratio of PA66 was inappropriate, and accordingly the result of the back-and-forth opening/closing durability test was poor.

In Comparative Example 3, only the aliphatic polyamide was not used, and accordingly the result of the back-and-forth opening/closing durability test was poor.

In Comparative Example 4, both of the aliphatic polyamide and the aromatic polyamide were used, but the melting point of the aromatic polyamide exceeded the specified range, and hence the result of the back-and-forth opening/closing durability test was poor, and the b value was also high.

In Comparative Example 5, no aliphatic polyamide was used, and accordingly the result of the back-and-forth opening/closing durability test was poor.

In Comparative Example 6, no aliphatic polyamide was used, additionally, the melting point of the aromatic polyamide was too high, and hence the result of the back-and-forth opening/closing durability test was poor, and the b value was high.

In Comparative Example 7, the melting point of the aliphatic polyamide was too low, and hence the slider tab pull off strength was degraded and the durability was also insufficient.

TABLE 1

|  |  | Example 1 | Example 2 | Example 3 | Example 4 | Example 5 | Example 6 | Example 7 |
|---|---|---|---|---|---|---|---|---|
| Polymer | PA66 (Tm = 265° C.) | 27% | 20% | 27% | 33% | 27% | 27% |  |
|  | PA610 (Tm = 225° C.) |  |  |  |  |  |  |  |
|  | PA11 (Tm = 193° C.) |  |  |  |  |  |  | 27% |
|  | MXD6 (Tm = 235° C.) | 13% | 20% | 13% | 17% |  | 13% | 13% |
|  | PA9T (Tm = 305° C.) |  |  |  |  | 13% |  |  |
|  | PA6T/PA6I (Tm = 320° C.) |  |  |  |  |  |  |  |
| Glass fiber ingredient (wt %) |  | 60% | 60% | 60% | 50% | 60% | 60% | 60% |
| Pigment | ZnS | 2.00% | 2.00% | 3.00% | 2.00% | 3.00% | 1.00% | 2.00% |
| Fastener test | Slider tab pull off strength 90° (N) | 195 | 201 | 190 | 185 | 180 | 198 | 180 |
|  | Back-and-forth opening-closing durability (number of times) | 1870 | 650 | 1640 | 1700 | 700 | 2000 | 1530 |
|  | Yellowish tint, b value (D65 light source) | 8.9 | 9.1 | 6.8 | 7.5 | 8.2 | 10.2 | 7.9 |

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Polymer | PA66 (Tm = 265° C.) | 40% | 13% |  | 27% |  |  |  |
|  | PA610 (Tm = 225° C.) |  |  |  |  |  |  |  |
|  | PA11 (Tm = 193° C.) |  |  |  |  |  |  | 27% |
|  | MXD6 (Tm = 235° C.) |  | 27% | 40% |  |  |  | 13% |
|  | PA9T (Tm = 305° C.) |  |  |  | 13% | 40% |  |  |
|  | PA6T/PA6I (Tm = 320° C.) |  |  |  |  |  | 50% |  |
| Glass fiber ingredient (wt %) |  | 60% | 60% | 60% | 60% | 60% | 50% | 60% |
| Pigment | ZnS | 2.00% | 2.00% | 2.00% | 3.00% | 2.00% | 2.00% | 2.00% |
| Fastener test | Slider tab pull off strength 90° (N) | 135 | 205 | 202 | 180 | 195 | 180 | 122 |
|  | Back-and-forth opening-closing durability (number of times) | 2000 | 120 | 100 | 450 | 520 | 380 | 590 |
|  | Yellowish tint, b value (D65 light source) | 6.7 | 8.5 | 6.5 | 15.8 | 8 | 15.5 | 7.7 |

Figure 2:
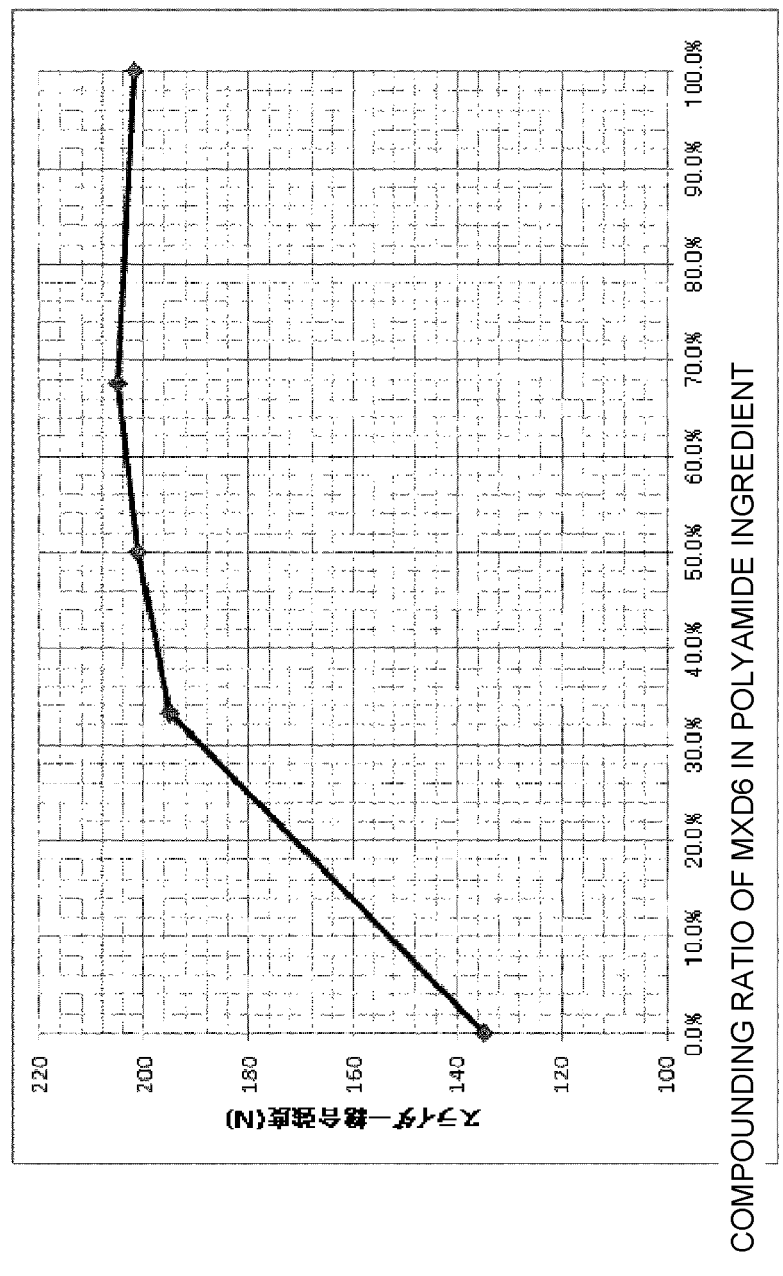
FIG. 2 shows the relation between the compounding ratio of MXD6 in a polyamide ingredient and the slider tab pull off strength.
Figure 3:
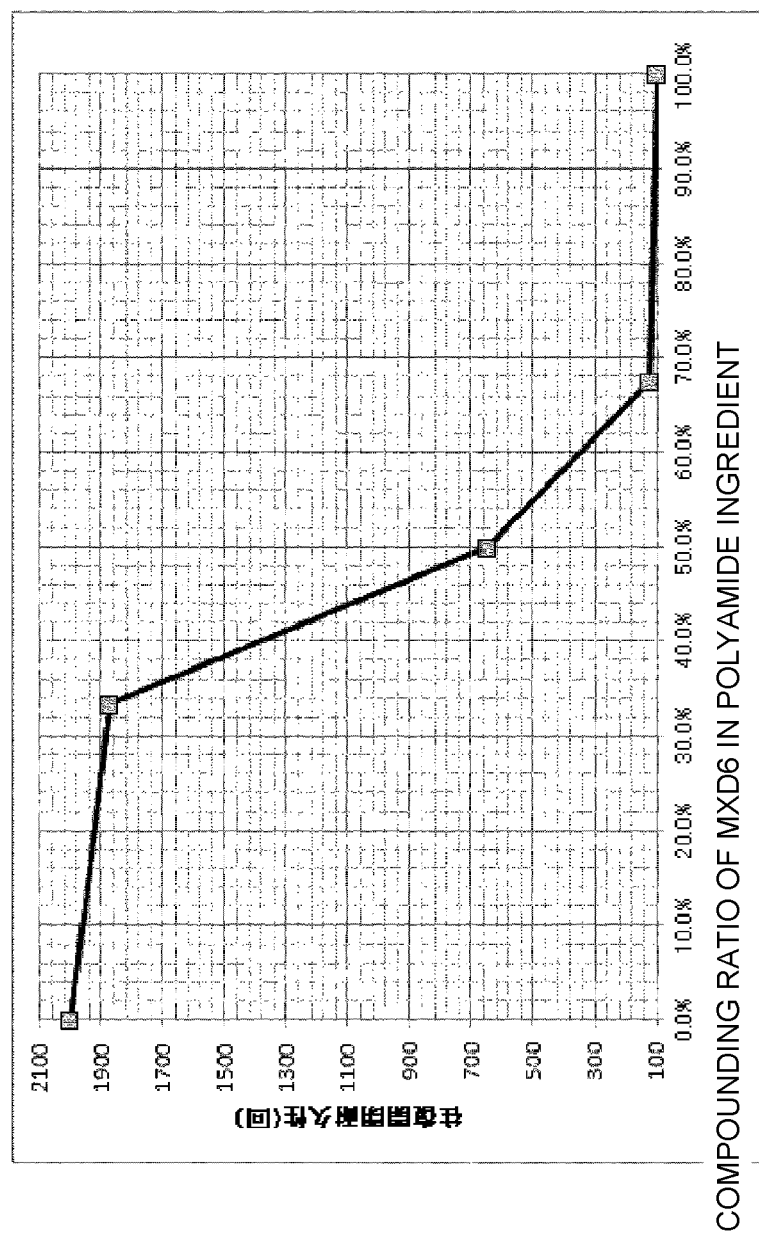
FIG. 3 shows the relation between the compounding ratio of MXD6 in the polyamide ingredient and the back-and-forth opening/closing durability of a slider.
Figure 4:
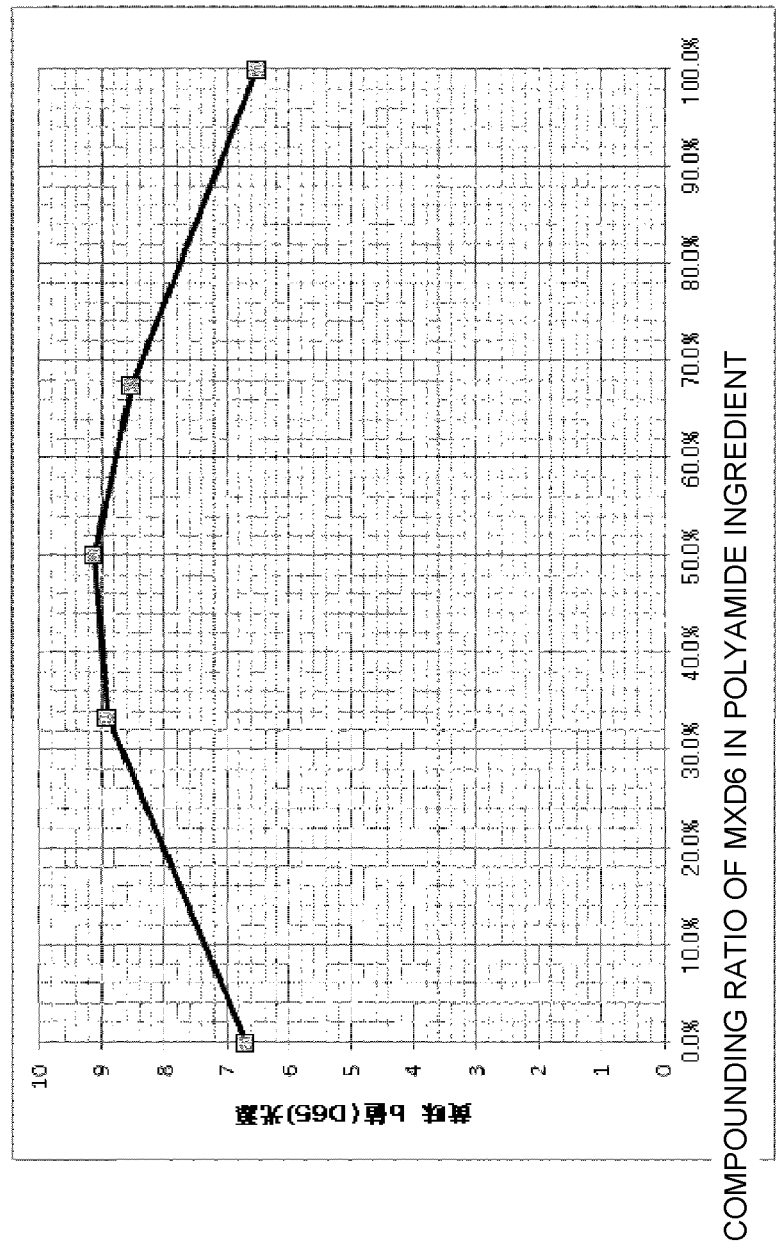
FIG. 4 shows the relation between the compounding ratio of MXD6 in the polyamide ingredient and the yellowish tint (b value).

In the above-described tests, Example 1, Example 2, Comparative Example 1, Comparative Example 2 and Comparative Example 3 are the same as each other with respect to the compounding ratios of the glass fiber and the pigment, and are different from each other in the compound ratios of PA66 and MXD6. For these Examples and Comparative Examples, the relations of the slider tab pull off strength, the back-and-forth opening/closing durability and the yellowish tint to the compounding ratio of MXD6 in the polyamide ingredient are collected in FIG. 2, FIG. 3 and FIG. 4, respectively. It can be seen that the slider tab pull off strength is increased as the compounding ratio of MXD6 is increased, but when the compounding ratio of MXD6 exceeds 50% by mass, the back-and-forth opening/closing durability becomes extremely poor. It can also be seen that when the compounding ratio of MXD6 is in the vicinity of 25 to 35% by mass, the balance among the slider tab pull off strength, the back-and-forth opening/closing durability and the yellowish tint is most excellent.

REFERENCE SIGNS LIST

10 Slide fastener
11 Long tapes
12 Elements
13 Slider
14 Top end stop
15 Opening device
16 Pull tab

The invention claimed is:

1. A resin slider for slide fasteners, formed by using as a material a polyamide resin composition including an aliphatic polyamide having a melting point of 220 to 310° C., an aromatic polyamide having a melting point of 230 to 310° C., and reinforcing fiber, wherein a ratio of the aromatic polyamide in a total mass of the aliphatic polyamide and the aromatic polyamide is 10% by mass or more and 50% by mass or less,
   wherein a melting point difference between the aliphatic polyamide and the aromatic polyamide is 50° C. or less, and
   wherein the melting points of the aliphatic polyamide and the aromatic polyamide are each defined as a peak top temperature of an endothermic peak when the endothermic quantity is measured by differential scanning calorimeter.

2. The resin slider for slide fasteners according to claim 1, wherein a content of the reinforcing fiber in a total mass of the aliphatic polyamide, the aromatic polyamide and the reinforcing fiber is 50 to 60% by mass.

3. The resin slider for slide fasteners according to claim 1, wherein the aliphatic polyamide includes one or more selected from the group consisting of polyamide 66, polyamide 610 and polyamide 612.

4. The resin slider for slide fasteners according to claim 1, wherein the aliphatic polyamide includes polyamide 66.

5. The resin slider for slide fasteners according to claim 1, wherein the aromatic polyamide includes polyamide MXD6.

6. The resin slider for slide fasteners according to claim 1, wherein the ratio of the aromatic polyamide in the total mass of the aliphatic polyamide and the aromatic polyamide is 20 to 40% by mass.

7. The resin slider for slide fasteners according to claim 1, wherein the resin composition includes a pigment in a content of 1 to 5% by mass based on the total mass of the aliphatic polyamide, the aromatic polyamide and the reinforcing fiber.

8. The resin slider for slide fasteners according to claim 1, wherein a b value in a Lab color system in an undyed state is 10 or less.

9. The resin slider for slide fasteners according to claim 1, wherein the slider is dyed.

10. A slide fastener provided with the resin slider for slide fasteners according to claim 1.

11. The resin slider for slide fasteners according to claim 1,
wherein the aliphatic polyamide is one or more selected from the group consisting of polyamide 66, polyamide 610, and polyamide 612, and
wherein the aromatic polyamide is one or more selected from the group consisting of polyamide MXD6 and polyamide 9T.

* * * * *

UNITED STATES PATENT AND TRADEMARK OFFICE
CERTIFICATE OF CORRECTION

PATENT NO. : 9,687,051 B2
APPLICATION NO. : 14/896872
DATED : June 27, 2017
INVENTOR(S) : Kazuya Mizumoto et al.

Page 1 of 1

It is certified that error appears in the above-identified patent and that said Letters Patent is hereby corrected as shown below:

In the Specification

In Column 2, Line 2, delete "platability." and insert -- palatability. --, therefor.

In Column 5, Line 62, delete "(11-aminodecanoic" and insert -- (10- aminodecanoic --, therefor.

In Column 10, Line 19, delete "back and forth" and insert -- back-and-forth --, therefor.

In Column 10, Line 29, delete "back- and forth" and insert -- back-and-forth --, therefor.

In Column 10, Line 36, delete "back- and forth" and insert -- back-and-forth --, therefor.

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*